Feb. 4, 1969            D. D. WEBB            3,425,061
ENERGY ABSORBING HELMET SHELL
Filed Sept. 8, 1967
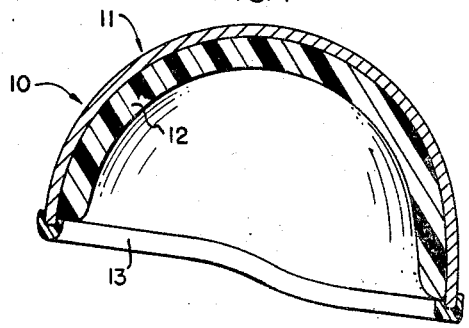
FIG. 1
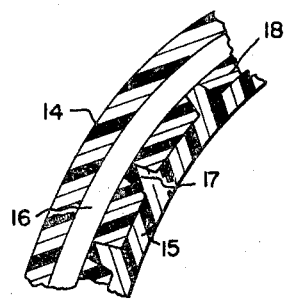
FIG. 2
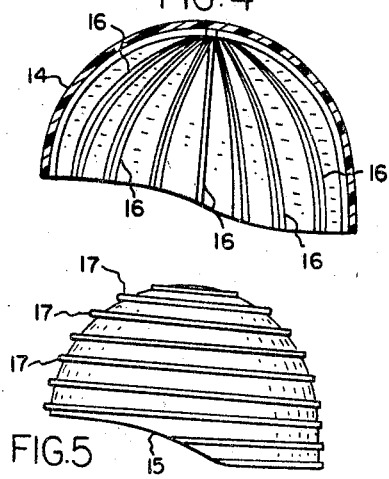
FIG. 4
FIG. 5
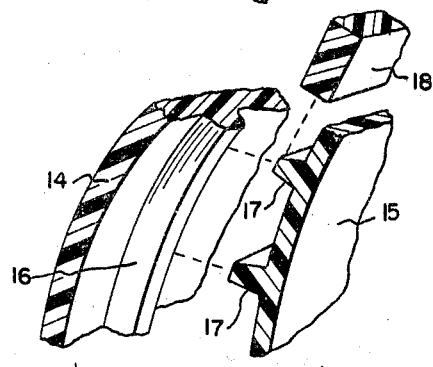
FIG. 3
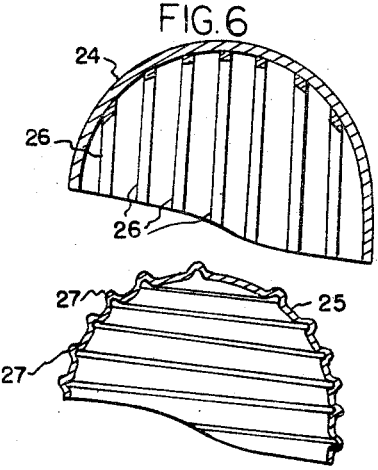
FIG. 6
FIG. 7
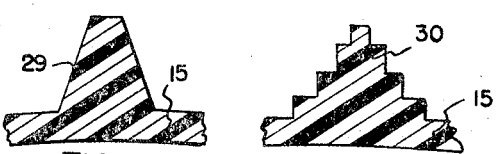
FIG. 8      FIG. 9
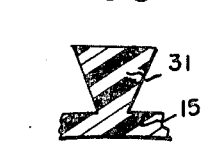
FIG. 10
INVENTOR
DANIEL D. WEBB
BY *Gullen, Sloman, & Panton*
ATTORNEYS

United States Patent Office 3,425,061
Patented Feb. 4, 1969

3,425,061
ENERGY ABSORBING HELMET SHELL
Daniel D. Webb, Birmingham, Mich.
(21620 Coolidge Highway, Oak Park, Mich. 48237)
Filed Sept. 8, 1967, Ser. No. 666,379
U.S. Cl. 2—3      6 Claims
Int. Cl. A42b 1/08

ABSTRACT OF THE DISCLOSURE

A safety helmet, energy absorbing shell formed of an inner and an outer shell layer, each having long, narrow ribs formed integral therewith, the ribs of one shell layer extending towards and transversely crossing and being in edge to edge contact with the ribs of the other, and with the ribs being crushable under impact to thereby absorb impact energy.

Background of invention

Plastic safety helmets used by motorcyclists, police officers, drivers, and the like, are normally constructed of a rigid, or semi-rigid protective shell within which is arranged a layer of energy absorbing material and, at times, additional inner protective layers. An example of a typical helmet of such type is illustrated in the patent to Marchello, No. 3,213,463, granted Oct. 26, 1965. In such helmet constructions, the shell is normally designed to deflect and distribute impact loads.

Such protective shells have been made of fibrous glass reinforced with a suitable resin or of a completely plastic resinous material. Such shells are not energy absorbent for all practical purposes.

Summary of invention

It is an object of this invention to form the helmet outer shell in such a way that it not only performs its expected function of impact deflection and distribution, but also performs an energy absorbing function independently of any interior energy absorbing layers arranged within the helmet.

In accordance with this objective, the outer shell is made of two thin shell layers rather than of a single thickness, the two layers being slightly spaced apart. Ribs, formed integral with each of the layers, extend towards and transversely cross each other. Thus, the ribs may crush or buckle under sufficiently high impact, to thereby absorb energy and prevent the transmission of such energy to the wearer's head. The voids between the ribs may be filled with a suitable energy absorbing foamed plastic material to increase the energy absorbing characteristic of the helmet shell.

In this manner, while the shell is thickened slightly as compared to a conventional single thickness shell, the energy absorbing characteristics of the helmet are substantially increased and, for certain purposes, the usual energy absorbing inner structure may be reduced in thickness or size accordingly.

These and other objects and advantages of this invention will become apparent upon reading the following description, of which the attached drawings form a part.

Description of drawings

FIG. 1 is a cross-sectional elevational view of an illustrative form of the helmet herein.

FIG. 2 is an enlarged cross-sectional view of a fragment of the helmet shell, and FIG. 3 is a fragmentary, enlarged, perspective view of the parts forming the shell.

FIG. 4 is a cross-sectional elevational view of the outer shell layer, and

FIG. 5 is an elevational view of the inner shell layer.

FIG. 6 is a cross-sectional view of a modified form of outer shell layer, and

FIG. 7 is a fragmentary cross-sectional view of a modified inner shell layer.

FIGS. 8, 9 and 10 each illustrate, in enlarged cross-sectional view, various cross-sectional forms of the ribs.

The crash or safety helmet 10 generally comprises a protective shell 11 which may be lined with an energy absorbing layer 12 formed of a suitable foamed plastic material, such as foamed polystyrene or the like. The free edge of the shell is finished with a rubber-like edge bead 13, secured thereto.

Such helmet may be additionally provided with a suitable head suspension and straps for securing the helmet to the wearer's head. The novelty herein relates to the outer shell 11 and therefore further descriptions of the energy absorbing layer, head suspension, straps, etc., are not given here.

Referring to FIGS. 2 and 3, the protective shell 11 is formed of two shell layers, namely, outer shell layer 14 and an inner shell layer 15. The outer shell layer is provided with a plurality of integral inwardly extending, long, narrow ribs 16. The inner shell layer 15 is provided with integral, long, narrow ribs 17. The ribs of one of the shell layers are arranged transversely of the ribs of the other shell layer, so that the ribs cross each other and are in contact at their places of crossing.

As an example of this rib construction, FIG. 4 shows the ribs on the outer shell layer 14, radiating from the upper center of the shell, while the ribs on the inner shell layer 15 are arranged horizontally.

Preferably the voids between the ribs are fillted with a suitable energy absorbing material 18, such as rigid urethane foam plastic or the like, which material may be either pre-cast and positioned during the assembly of the inner and outer shell layers, or alternatively may be forced into the voids after assembly of the shell layers and hence, cast in place to fill the voids.

The inner and outer shell layers are made separately of a suitable plastic material which may be either rigid, such as fibrous glass reinforced resins or semi-rigid, that is, stiff with some small degree of flexibility. Once the inner and outer shell layers are assembled together as shown in FIG. 2, the ordinary energy absorbing layer 12 and the suspension and like may be added to the completed shell.

The two halves or layers making up the outer shell may be secured together by a suitable adhesive, or by the void filling material 18, or by heat welds. Alternately, the layers may be frictionally locked together.

The ribs may be formed in a variety of ways in order to achieve the energy absorbing characteristics desired therefrom. For example, FIG. 6 shows an outer shell layer 24 and an inner shell layer 25, with the ribs 26 of the outer shell arranged vertically and the ribs 27 of the inner shell formed by bent portions thereof.

By varying the cross-sectional shape of the ribs, the energy absorbing characteristics of the shell may be designed for particular expected loads so that the helmets may be designed for a specific type of use. For example, FIG. 8 shows a rib designed in a truncated triangular shape which will increasingly resist crushing or deformation under load so as to increasingly absorb more energy, thereby providing a variable energy absorbing characteristic.

FIG. 9 illustrates a rib 30 formed in a step-like configuration, which will increase its energy absorbing characteristics and resistance to deformation in predetermined increments.

FIG. 10 illustrates a rib configuration 31, which is roughly an upside down arrangement of that of FIG. 8, and which will provide a variable energy absorbing characteristic.

Once the purpose for a particular helmet is determined, and the expected types of impacts and forces contemplated, the cross-sectional shape of the ribs may be varied as suggested above, to provide maximum energy absorption for that particular use.

Having fully described an operative embodiment of this invention, I now claim:

1. A safety helmet comprising an outer shell layer and an inner shell layer closely fitted within the outer shell layer, with the two layers spaced apart a short distance;
   a plurality of narrow, elongated ribs formed integral with one of the layers and extending across the space between the two layers;
   said ribs being crushable under sufficient force of impact to thereby absorb at least a portion of the energy of impact.

2. A safety helmet as defined in claim 1, and including a plurality of narrow, elongated ribs formed integral with the other of said layers and extending toward the ribs of said one layer, with the ribs of one layer being transverse to and in edge to edge contact with the ribs of the other layer at the areas where the ribs cross each other.

3. A safety helmet as defined in claim 1, and said ribs being shaped in cross-section, narrower at their free edges than at their bases, so as to increasingly resist crushing.

4. A safety helmet as defined in claim 2, and including an energy absorbing filler material arranged between the ribs of the two layers to fill the voids between the two layers and thereby absorb energy of impact applied to the helmet.

5. A safety helmet comprising an outer shell layer and an inner shell layer fitted within and spaced a short distance from the outer shell layer;
   a plurality of narrow, elongated ribs formed integral with the outer shell layer and extending inwardly towards the inner shell layer;
   a plurality of narrow, elongated ribs formed integral with the inner shell layer and extending outwardly towards the outer shell layer;
   the ribs of the outer shell layer extending transversely of and in edge to edge contact at the areas of crossing with the ribs of the inner shell layer;
   said ribs being crushable under impact to the helmet and being shaped in cross-section to increase in resistance to crushing as their heights increase.

6. A safety helmet as defined in claim 5, and including a layer of energy absorbing filler material arranged between the ribs between the spaces between the two shell layers to substantially fill such spaces and thereby absorb impact energy applied to the helmet.

References Cited
UNITED STATES PATENTS

| | | | |
|---|---|---|---|
| 882,686 | 3/1908 | Ireland et al. | 2—3 |
| 2,123,275 | 7/1938 | Dym | 2—3 |
| 2,664,567 | 1/1954 | Nichols | 2—3 |
| 3,186,004 | 6/1965 | Carlini | 2—3 |
| 3,280,402 | 10/1966 | Scheibchen | 2—3 |

JAMES R. BOLER, *Primary Examiner.*